US012283675B2

United States Patent
Tang et al.

(10) Patent No.: US 12,283,675 B2
(45) Date of Patent: Apr. 22, 2025

(54) BATTERY MODULE AND BATTERY MODULE STACK

(71) Applicant: CORVUS ENERGY INC., Richmond (CA)

(72) Inventors: Siu Lun Isaac Tang, Richmond (CA); Jeremy Lindstrom, Richmond (CA); Geoffrey Frederick Crocker, Richmond (CA)

(73) Assignee: CORVUS ENERGY INC., Richmond (CA)

( * ) Notice: Subject to any disclaimer, the term of this patent is extended or adjusted under 35 U.S.C. 154(b) by 633 days.

(21) Appl. No.: 17/295,872

(22) PCT Filed: Nov. 21, 2019

(86) PCT No.: PCT/CA2019/051674
§ 371 (c)(1),
(2) Date: May 20, 2021

(87) PCT Pub. No.: WO2020/102909
PCT Pub. Date: May 28, 2020

(65) Prior Publication Data
US 2021/0399362 A1     Dec. 23, 2021

Related U.S. Application Data

(60) Provisional application No. 62/770,806, filed on Nov. 22, 2018.

(51) Int. Cl.
*H01M 10/6556*     (2014.01)
*H01M 10/42*       (2006.01)
(Continued)

(52) U.S. Cl.
CPC ... *H01M 10/6556* (2015.04); *H01M 10/4257* (2013.01); *H01M 10/613* (2015.04);
(Continued)

(58) Field of Classification Search
CPC .......... H01M 10/613; H01M 10/6556; H01M 10/647; H01M 10/6561; H01M 10/4257; H01M 50/209
See application file for complete search history.

(56) References Cited

U.S. PATENT DOCUMENTS 7,727,667 B2 * 6/2010 Sakurai ............... H01M 50/258
429/129
9,564,663 B2   2/2017 Kim et al.
(Continued)

FOREIGN PATENT DOCUMENTS

CN      101740802 A    6/2010
CN      102170034 A    8/2011
(Continued)

OTHER PUBLICATIONS

International Search Report in International Application No. PCT/CA2019/051674, mailed on Feb. 27, 2020.
(Continued)

*Primary Examiner* — Karie O'Neill Apicella
(74) *Attorney, Agent, or Firm* — Hershkovitz & Associates, PLLC; Abe Hershkovitz

(57) ABSTRACT

There is described a battery module comprising: a cell enclosure for housing a plurality of battery cells; and a cooling assembly. The cooling assembly comprises a cooling channel extending from an aperture in a first side of the battery module to an aperture in a second side of the battery module. The cooling channel is positioned such that heat generated within the cell enclosure may be transferred to a cooling 5 fluid flowing, via the cooling channel, from the first side of the battery module to the second side of the battery module. There is also described a battery module stack comprising multiple such battery modules. The battery modules are arranged in a stacked formation such that the
(Continued)

cooling channel of at least one battery module is aligned with the cooling channel of at least one adjacent battery module.

12 Claims, 20 Drawing Sheets

(51) Int. Cl.
| | | |
|---|---|---|
| *H01M 10/613* | (2014.01) | |
| *H01M 10/647* | (2014.01) | |
| *H01M 10/6561* | (2014.01) | |
| *H01M 50/204* | (2021.01) | |
| *H01M 50/209* | (2021.01) | |
| *H01M 50/262* | (2021.01) | |
| *H01M 50/271* | (2021.01) | |

(52) U.S. Cl.
CPC ..... *H01M 10/647* (2015.04); *H01M 10/6561* (2015.04); *H01M 50/204* (2021.01); *H01M 50/209* (2021.01); *H01M 50/262* (2021.01); *H01M 2010/4278* (2013.01); *H01M 50/271* (2021.01)

(56) References Cited

U.S. PATENT DOCUMENTS

| | | |
|---|---|---|
| 9,774,015 B2 | 9/2017 | Moon et al. |
| 10,170,741 B2 | 1/2019 | Kovent |
| 2005/0208375 A1 | 9/2005 | Sakurai |
| 2010/0297486 A1 | 11/2010 | Fuji |
| 2012/0263991 A1 | 10/2012 | Temmyo et al. |
| 2014/0087221 A1 | 3/2014 | Kim et al. |
| 2014/0308551 A1 | 10/2014 | Schroeder et al. |
| 2016/0204398 A1 | 7/2016 | Moon et al. |
| 2017/0047624 A1 | 2/2017 | Gunna et al. |
| 2017/0229688 A1 | 8/2017 | Kovent |
| 2018/0175466 A1 | 6/2018 | Seo et al. |
| 2018/0294536 A1 | 10/2018 | Kruszelnicki |
| 2019/0097193 A1 | 3/2019 | Kovent |
| 2019/0140229 A1* | 5/2019 | Lindstrom .......... H01M 10/613 |
| 2019/0140235 A1 | 5/2019 | Lindstrom et al. |

FOREIGN PATENT DOCUMENTS

| | | | |
|---|---|---|---|
| CN | 102376920 A | 3/2012 | |
| CN | 104620406 A | 5/2015 | |
| EP | 3319146 A1 | 5/2018 | |
| JP | 2005268004 A | 9/2005 | |
| JP | 2012079508 A | 4/2012 | |
| JP | 2013058373 A | 3/2013 | |
| JP | 2015159052 A | 9/2015 | |
| WO | WO 2017/181282 A1 | 10/2017 | |
| WO | WO 2017/181283 A1 | 10/2017 | |
| WO | WO-2018062869 A1 * | 4/2018 | .......... H01M 10/613 |

OTHER PUBLICATIONS

Written Opinion of the International Searching Authority in International Application No. PCT/CA2019/051674, mailed on Feb. 27, 2020.
English language Abstract of JP 2005268004 A (Sep. 29, 2005).
Office Action in corresponding Japanese Application No. 2021529700, dated Jan. 4, 2024.
English language translation of the Office Action in corresponding Japanese Application No. 2021529700, dated Jan. 4, 2024.
English language Abstract of CN 101740802 A (Jun. 16, 2010).
English language Abstract of CN 102170034 A (Aug. 31, 2011).
English language Abstract of CN 102376920 A (Mar. 14, 2012).
English language Abstract of CN 104620406 A (May 13, 2015).
English language Abstract of JP 2012079508 A (Apr. 19, 2012).
English language Abstract of JP 2013058373 A (Mar. 28, 2013).
Machine English language translation of JP 2015159052 A (Sep. 3, 2015).

* cited by examiner

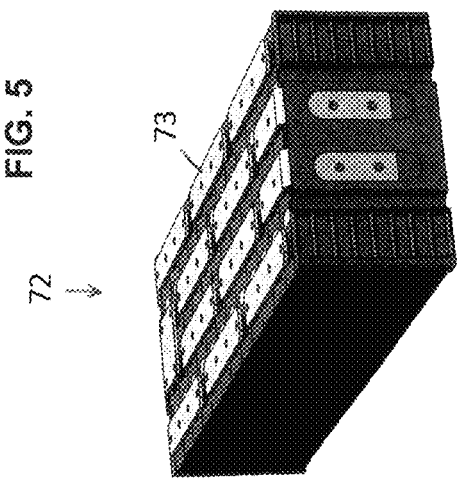
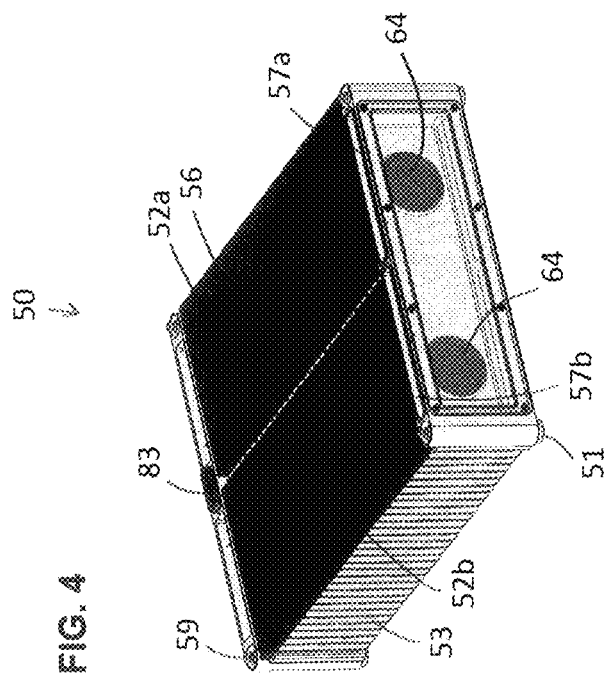

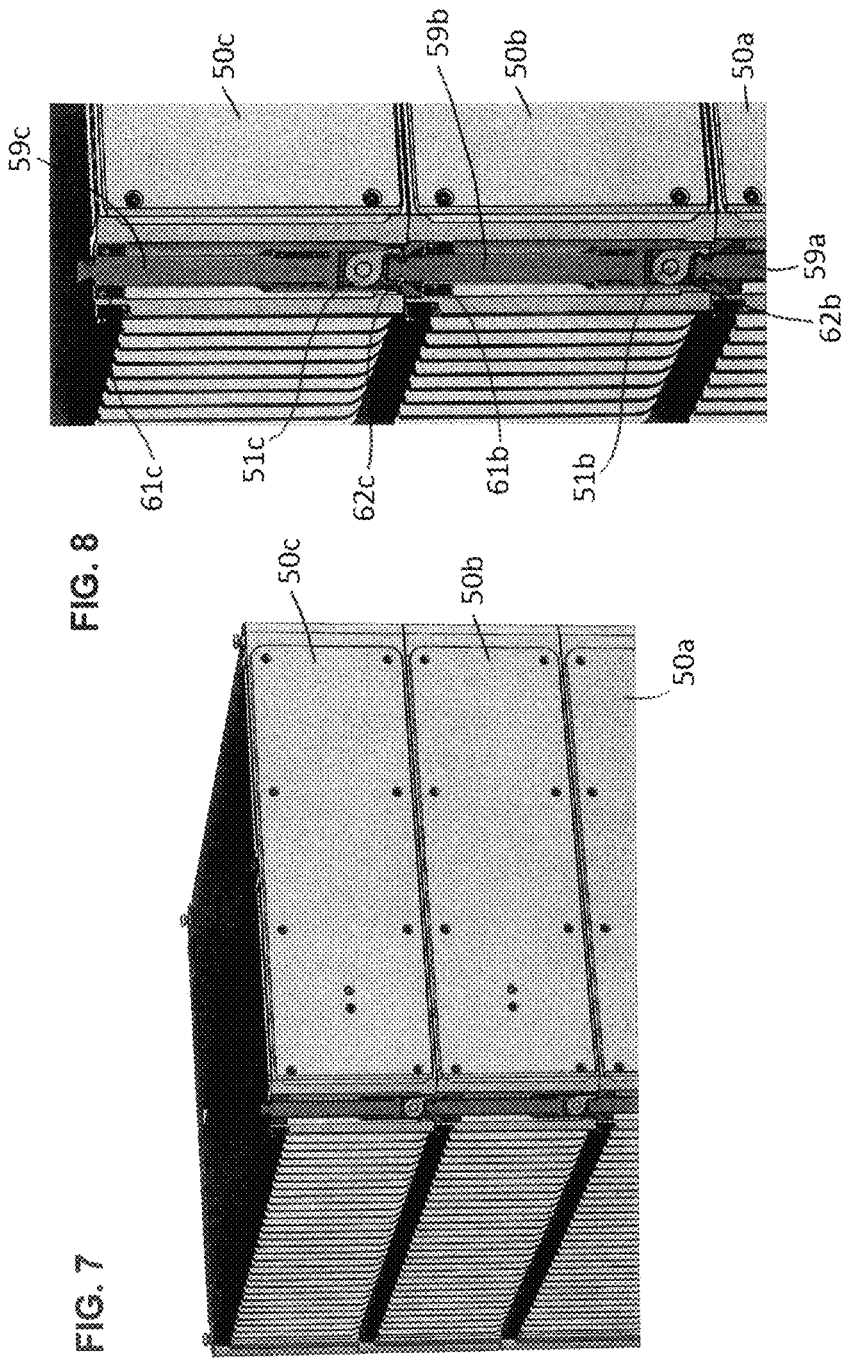

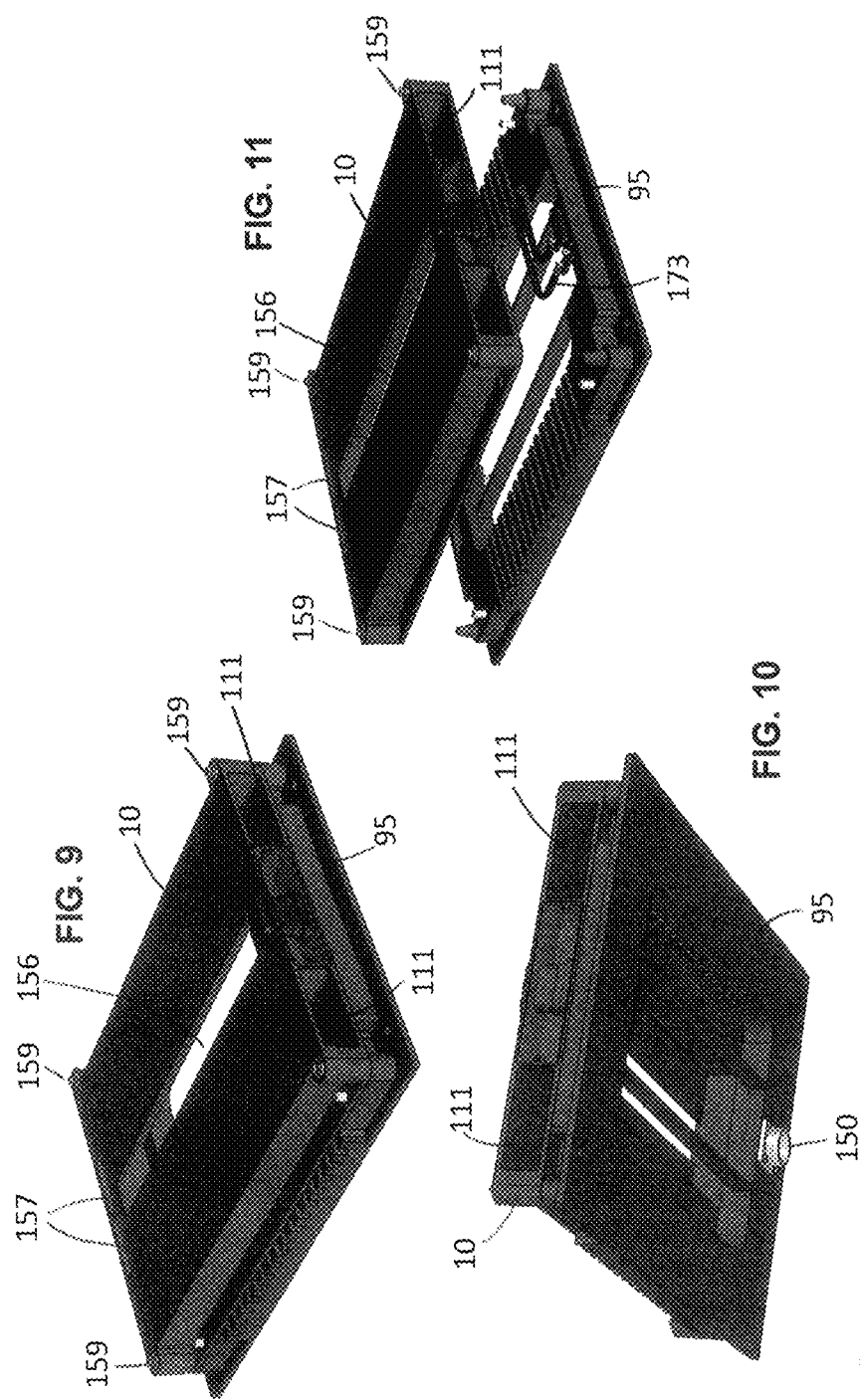

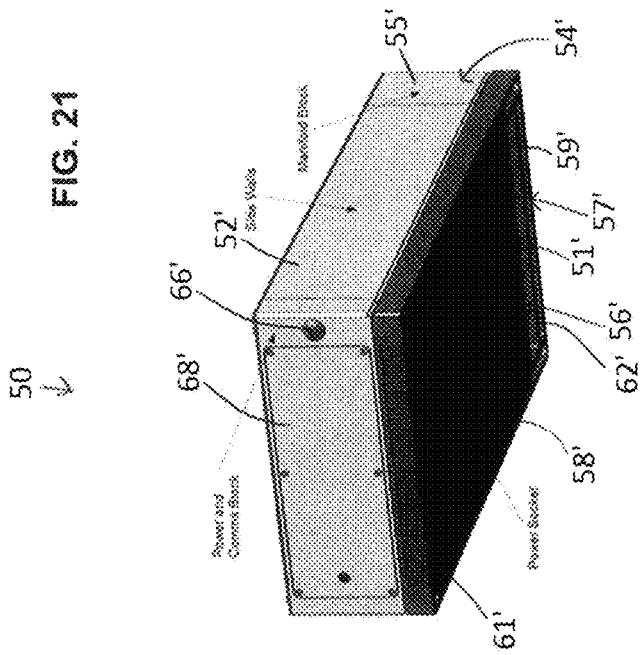
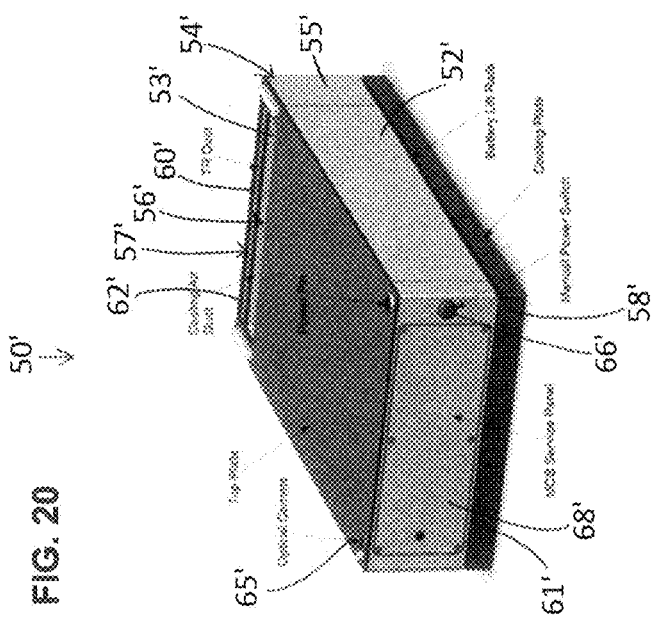

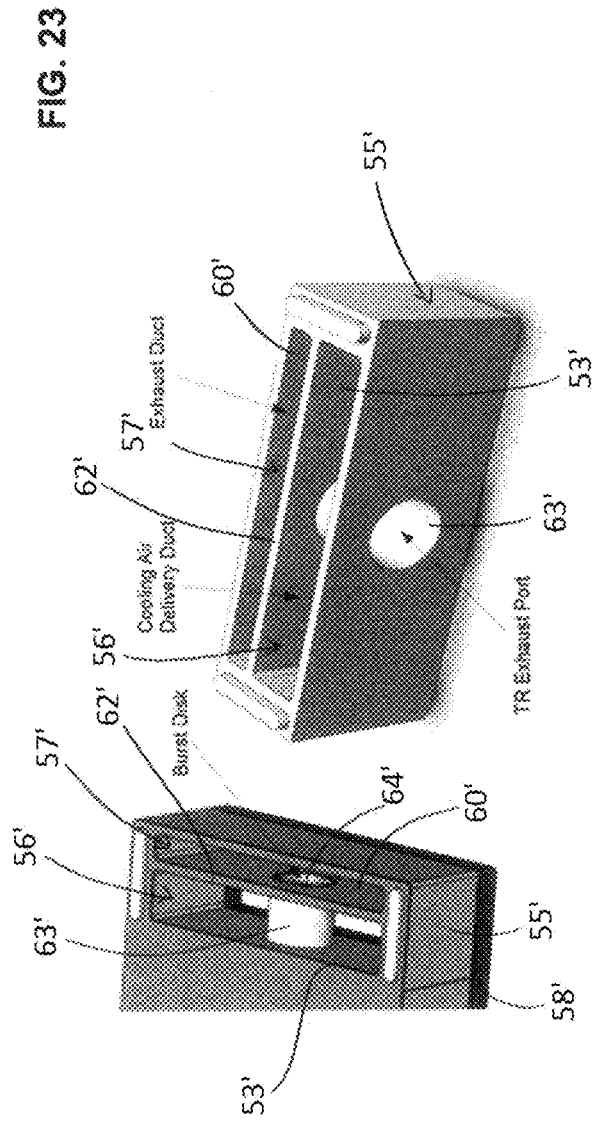

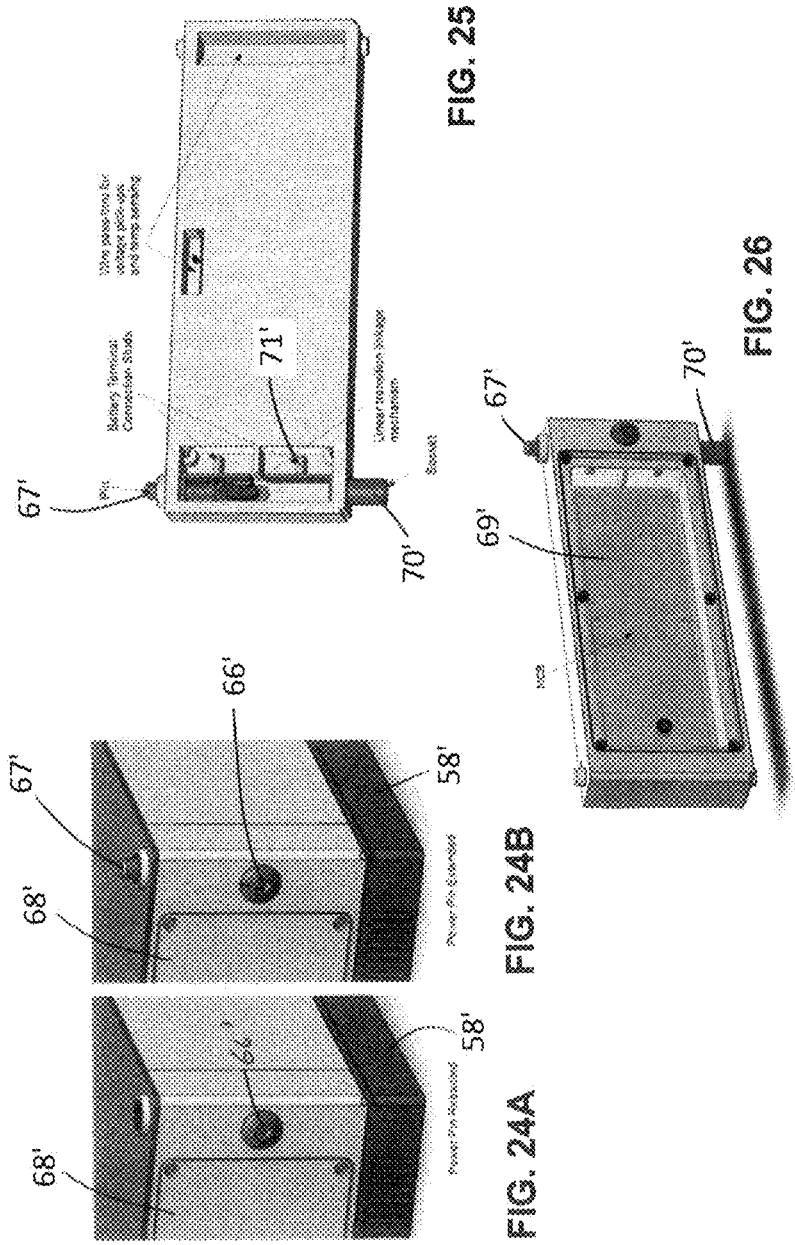

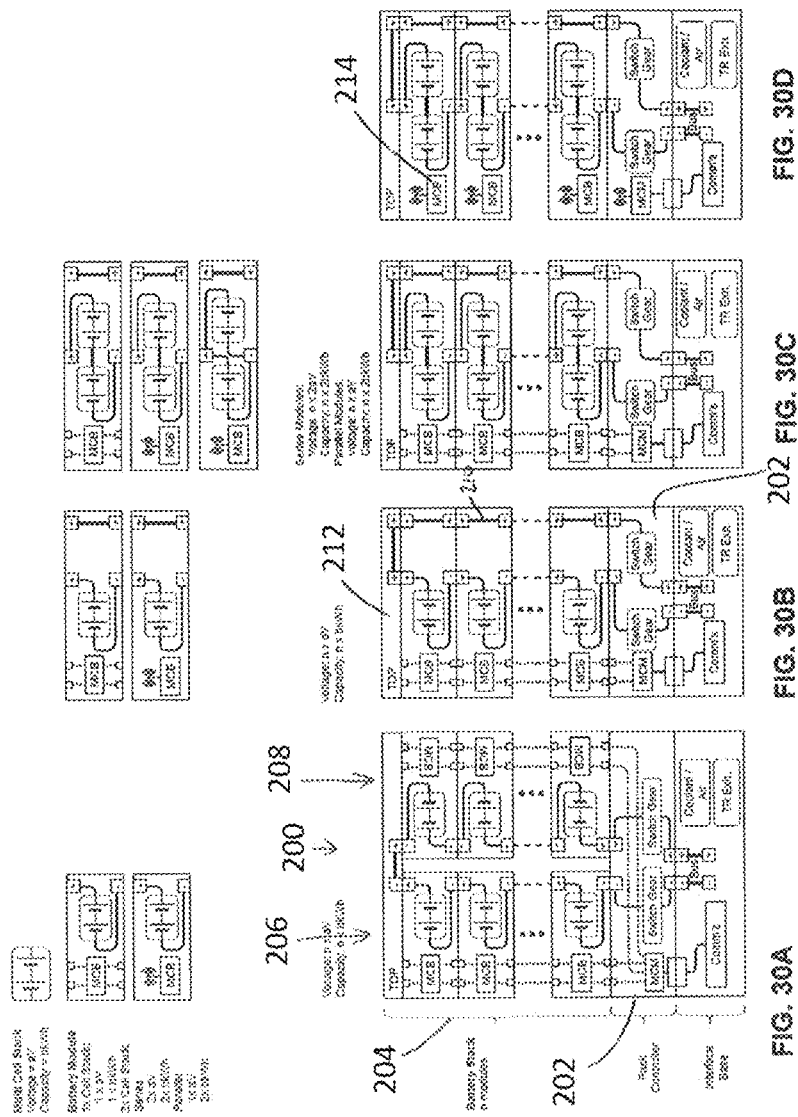

BATTERY MODULE AND BATTERY MODULE STACK

FIELD OF THE DISCLOSURE

The present disclosure relates to a battery module and to a battery module stack comprising multiple battery modules.

BACKGROUND TO THE DISCLOSURE

One type of rechargeable battery is a lithium-ion battery having a multiple-layered structure comprising a positive electrode activated by various mixed oxides or olivines, a negative electrode activated by special carbon, and a separator all immersed in an organic electrolyte. The battery is typically housed in an enclosure to form a battery module. During normal operating conditions, electrical energy is converted to and stored as chemical energy during charging, and stored chemical energy is converted to electrical energy during discharging. More particularly, during charging, lithium in the positive electrode is ionized and moves from layer to layer to the negative electrode; during discharging, the ions move to the positive electrode and return to its original compound. Multiple lithium-ion battery modules can be mounted on a rack assembly, together with a control module for controlling the battery modules, to form a battery pack.

Various different types of racks may be used for storing and transporting interconnected battery modules. In its simplest form, a rack may comprise a framework with a number of bays into which the battery modules are inserted. Power and cooling lines may then be connected to the battery modules. In another variation, a rack may include a backplane that houses the power connections. A battery module, with its power connectors at the rear of the module, is inserted into a bay and plugged directly into the backplane.

However, in general the use of a rack complicates the battery pack. For example, using a rack to house battery modules increases the number of components that form the battery pack, increasing the pack's manufacturing costs. In addition, racks that employ a backplane may be prone to alignment issues arising between the battery module's power connectors and the backplane's power lines.

There therefore remains a need in the art to provide a battery module that enables simpler and more efficient storing and transporting of multiple interconnected battery modules.

SUMMARY OF THE DISCLOSURE

In a first aspect of the disclosure, there is provided a battery module comprising: at least one cell enclosure for housing a plurality of battery cells; and a cooling assembly: comprising a cooling channel extending from an aperture in a first side of the battery module to an aperture in a second side of the battery module; and positioned such that heat generated within the cell enclosure may be transferred to a cooling fluid flowing, via the cooling channel, from the first side of the battery module to the second side of the battery module. Thus, a first exterior side of the module may be fluidly connected to a second exterior side of the module.

The battery module may further comprise an exhaust assembly comprising an exhaust channel extending from an aperture in one side of the battery module to an aperture in another side of the battery module; and an exhaust port extending from the cell enclosure to the exhaust channel. The exhaust channel may extend from an aperture in the first side of the battery module to an aperture in the second side of the battery module.

The battery module may further comprise a seal sealing the exhaust port and configured to open in response to a pressure within the cell enclosure reaching a critical pressure and thereby allowing exhaust gases to flow from the cell enclosure to the exhaust channel. The seal may be configured to open in response to thermal runaway occurring within the cell enclosure.

The exhaust port may extend through the cooling channel.

The cooling assembly may be located between the cell enclosure and the exhaust assembly.

The at least one cell enclosure may comprise first and second cell enclosures on respective sides of the battery module, and the cooling channel may extend between the first and second cell enclosures. The cooling channel may extend along a length of each of the first and second cell enclosures.

The battery module may further comprise a heat sink provided on one or more sides of the battery module. The heat sink may comprise one or more cooling fins. The heat sink may comprise a spreader plate or heat pipes for directing heat to the cooling assembly.

The battery module may further comprise at least one first locking member extending from an upper or lower edge of the battery module. The battery module may further comprise at least one first locking member extending from an upper or lower corner of the battery module.

The battery module may further comprise at least one second locking member located in an edge or corner of the battery module that is opposite an edge or corner of the battery module from which the at least one first locking member extends.

The battery module may further comprise a power and communication assembly comprising one or more of circuitry and a processor configured to monitor one or more battery cells housed within the battery module. The power and communication assembly may be located at a first end of the battery module, and the cooling assembly may be located at an opposite, second end of the battery module. The power and communication assembly may be located at a front end of the battery module, and wherein the cooling assembly is located at a rear end of the battery module. Thus, a majority of the potentially serviceable components may be located at the front of the battery module, such that they can be easily accessed.

The power and communication assembly may comprise a power pin movable between a first position and a second position. In some embodiments, in the first "retracted" position, the power pin may be retracted within the battery module, and in the second "extended" position the power pin may extend out of the battery module. In some embodiments, the power pin may be located within the battery module in both its retracted position and its extended position. The battery module may further comprise a switch configured, when actuated, to cause the power pin to move between the first and second positions. Thus, by retracting the power pin, the battery module may be rendered safer for handling/transportation. In addition, retracting the power pin interrupts the power loop in an assembled module stack, for example in order to service components of the module.

The power and communication assembly may further comprise a power socket located on an exterior surface of the battery module. The power socket may be located on an underside of the battery module, and the power pin, when in the second position, may extend out of an upper side of the battery module. The power pin and the power socket may be located directly opposite one another.

The battery module may further comprise a removable panel on a front surface of the battery module for accessing one or more components of the power and communication assembly.

The power and communication assembly may further comprise a first optical communication port on one side of the battery module and a second optical communication port on another side of the battery module.

The power and communication assembly may further comprise a wireless communications module for communicating with one or more other battery modules.

The battery module may further comprise a heat sink adjacent the cell enclosure. The heat sink may fluidly connect the cooling channel and an exterior of the battery module; and heat generated within the cell enclosure may be transferred away from the battery module by being transferred to a cooling fluid flowing from the cooling channel to the exterior of the battery module, via the heat sink. The heat sink may comprise a fluid flow path extending from the cooling channel into the heat sink via one or more inlets, and returning from the heat sink into the cooling channel via one or more outlets; and heat generated within the cell enclosure may be transferred away from the battery module by being transferred to a cooling fluid entering the cooling channel from the first side of the battery module, flowing to the fluid flow path, returning to the cooling channel, and exiting the cooling channel to the second side of the battery module.

One or more of the cooling channel, the exhaust channel, and the power socket may extend through the heat sink.

The cooling fluid may comprise one or more of: forced air, liquid coolant, or air flowing by convection.

The battery module may further comprise one or more male connectors on one of a top side and a bottom side of the battery module, and one or more female connectors on the other of the top side and the bottom side of the battery module, and at least one of the connectors may comprise a tapered portion. For example, the one or more female connectors may comprise a tapered portion.

The one or more male connectors may comprise the at least one first locking member, and the one or more female connectors may comprise the at least one second locking member.

The one or more male connectors may comprise one or more power pins, and the one or more male connectors may comprise one or more power sockets.

In a further aspect of the disclosure, there is provided a battery module stack comprising multiple battery modules, each battery module comprising: at least one cell enclosure for housing a plurality of battery cells; and a cooling assembly comprising a cooling channel: extending from an aperture in a first side of the battery module to an aperture in a second side of the battery module; and positioned such that heat generated within the cell enclosure may be transferred to a cooling fluid flowing, via the cooling channel, from the first side of the battery module to the second side of the battery module, wherein the battery modules are arranged in a stacked formation such that the cooling channel of at least one battery module is aligned with the cooling channel of at least one adjacent battery module.

The battery module stack may further comprise a base at a bottom of the stacked formation; and an air delivery device configured to cause air to flow through the base and through the cooling channels of the stacked battery modules, via a cooling channel formed within the base and in fluid communication with the cooling channels of the stacked battery modules.

Each battery module may further comprise: an exhaust assembly comprising an exhaust channel extending from an aperture in a first side of the battery module to an aperture in a second side of the battery module; and an exhaust port extending from the cell enclosure to the exhaust channel; and the exhaust channel of at least one battery module may be aligned with the exhaust channel of at least one adjacent battery module. The base may comprise an exhaust outlet in fluid communication with the exhaust channels of the stacked battery modules.

Advantageously, the integrated nature of the cooling and/or exhaust assemblies with the battery modules may allow the module stack to be assembled without the need for a dedicated backplane. A backplane may refer to a singular structure that houses power connections for battery modules, and to which multiple battery modules are connected or "plugged into".

The battery module stack may further comprise a pack controller communicatively coupled with the battery modules, and operable to control operation of the battery modules. The pack controller may be stacked with the battery modules.

The battery module stack may further comprise a cover positioned on top of the stacked formation such that the cooling channel of an uppermost battery module of the stacked formation is sealed.

The battery module stack may further comprise a stabilizing mechanism configured to apply compression to the stacked formation for stabilizing the stacked formation.

The stabilizing mechanism may comprise one or more cables or solid bars (such as tie rods) attached to the cover and to one or more points at least as low as a lowermost battery module of the stacked formation.

In addition, the cover may terminate coolant manifolds in the case of liquid-cooled modules, the cover may house a "jumper" bus bar for returning current back towards the base of the stack, and the cover may jumper communications for directing them back towards the base of the stack.

Each battery module may further comprise one or more locking members engaging with corresponding locking members of one or more of an immediately adjacent upper battery module and an immediately adjacent lower battery module. The one or more locking members of a battery module may be configured to engage with the corresponding locking members of an immediately adjacent upper battery module in response to a further battery module being stacked on top of the immediately adjacent upper battery module.

In a further aspect of the disclosure, there is provided a method of assembling a battery module stack by stacking multiple battery modules to form a stacked formation, wherein: each battery module comprises: at least one cell enclosure for housing a plurality of battery cells; and a cooling assembly: comprising a cooling channel extending from an aperture in a first side of the battery module to an aperture in a second side of the battery module; and positioned such that heat generated within the cell enclosure may be transferred to a cooling fluid flowing, via the cooling channel, from the first side of the battery module to the second side of the battery module; and wherein the stacked formation is such that the cooling channel of at least one battery module is aligned with the cooling channel of at least one adjacent battery module.

The method may further comprise positioning a cover on top of the stacked formation such that the cooling channel of the uppermost battery module of the stacked formation is sealed. The method may further comprise using a stabilizing mechanism to apply compression to the stacked formation for stabilizing the stacked formation.

In a further aspect of the disclosure, there is provided a method of using a battery module stack, the battery module stack comprising multiple battery modules, each battery module comprising: at least one cell enclosure for housing a plurality of battery cells; a cooling assembly comprising a cooling channel: extending from an aperture in a first side of the battery module to an aperture in a second side of the battery module; and positioned such that heat generated within the cell enclosure may be transferred to a cooling fluid flowing, via the cooling channel, from the first side of the battery module to the second side of the battery module, wherein the battery modules are arranged in a stacked formation such that the cooling channel of at least one battery module is aligned with the cooling channel of at least one adjacent battery module, the method comprising: identifying a battery module in need of removal from the stacked formation; engaging a lifting mechanism with the battery module immediately above the identified battery module; and using the lifting mechanism to lift the battery modules above the identified battery module from the stacked formation.

In a further aspect of the disclosure, there is provided a method of making a battery module stack, comprising: using a lifting mechanism to position a battery module stack according to any of the above-described embodiments into a predetermined location relative to an interface base, wherein in the predetermined location the cooling channels of the battery module stack are aligned within one or more apertures formed in the interface base, such that air delivered through the interface base may flow into the cooling channels of the battery module stack.

BRIEF DESCRIPTION OF THE DRAWINGS

Embodiments of the disclosure will now be described in conjunction with the accompanying drawings of which:

FIG. 4 shows a rear of the battery module of FIG. 2, with the rear cover shown transparently;

FIG. 5 shows a stack of battery cells;

FIGS. 7 and 8 show interlocking battery modules in more detail, according to embodiments of the disclosure;

FIGS. 9-11 are views of a module stack base and an interface base according to embodiments of the disclosure;

FIGS. 20 and 21 show a top and a bottom of a battery module according to embodiments of the disclosure;

FIGS. 22 and 23 show a cooling and exhaust manifold of the battery module of FIGS. 20 and 21;

FIGS. 24A and 24B show, respectively, a power pin in its retracted and extended states, according to embodiments of the disclosure;

FIG. 25 is a rear view of a front cover of the battery module of FIGS. 20 and 21;

FIG. 26 is a front view of the front cover of FIG. 25, with a protective service panel removed;

FIGS. 30A-30D and 31 show circuit diagrams of interconnected battery modules.

DETAILED DESCRIPTION OF EMBODIMENTS

The present disclosure seeks to provide improved battery modules and battery packs. While various embodiments of the disclosure are described below, the disclosure is not limited to these embodiments, and variations of these embodiments may well fall within the scope of the disclosure which is to be limited only by the appended claims.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

In what follows, a battery module refers generally to an enclosure housing multiple interconnected battery cells. The battery cells form one or more battery cells stacks (which may also be referred to as battery cell strings). Multiple battery modules stacked on top of one another form generally a battery module stack (or simply a module stack). When one or more battery modules are connected to a module controller (also referred to as a pack controller), the combination of battery module(s) and module controller forms generally a battery pack. The pack controller may be stacked with a battery module stack, or may located outside of the module stack.

Figure 1:
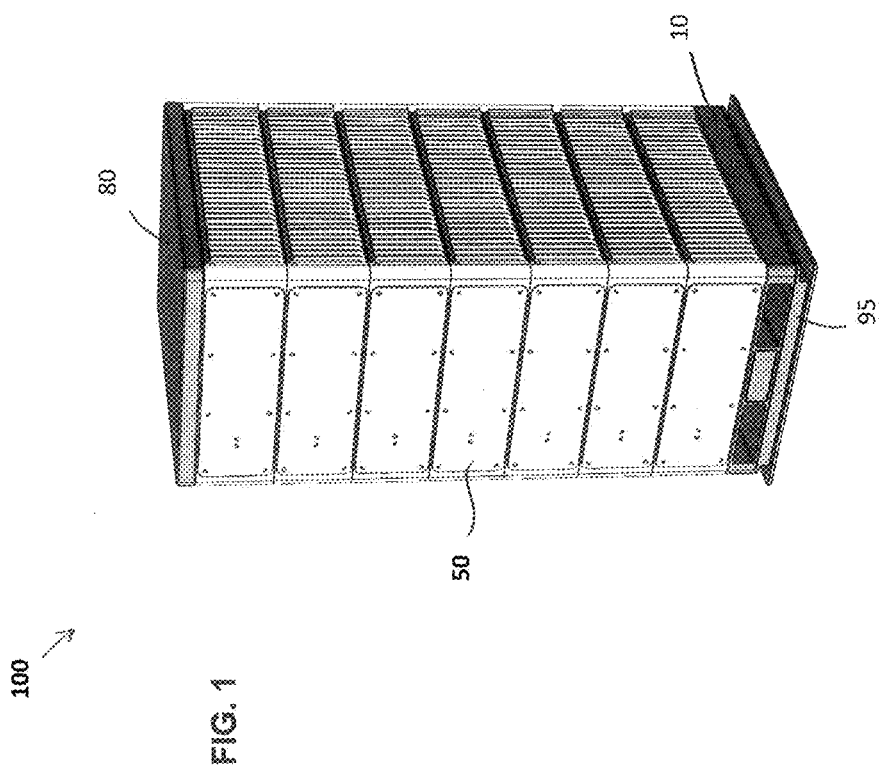
FIG. 1 shows a battery module stack according to embodiments of the disclosure.

Turning to FIG. 1, there is shown a battery module stack 100 according to an embodiment of the disclosure. Module stack 100 is formed of a stacked arrangement of different components. In particular, module stack 100 comprises a module stack base 10 at a bottom thereof, a stack of interconnected battery modules 50 stacked on top of module stack base 10, and a module stack cover 80 positioned at the top of module stack 100, directly adjacent the uppermost battery module 50. Module stack 100 is stacked on top of an interface base 95, such that module stack base 10 engages with an upper surface of interface base 95. It will be understood by the skilled person that the disclosure extends to battery packs with any number of stacked battery modules and any number of columns of stacked battery modules. Furthermore, in some embodiments the module stack may be formed without module stack cover 80 and/or without module stack base 10. Therefore, in some embodiments the module stack may comprise of only one or more columns of stacked battery modules.

The footprint of module stack 100 is roughly the same as that of a standard-size pallet. In particular, the footprint of module stack 100 is roughly the same a standard EUR 2 European-size pallet, as defined by the European Pallet Association (e.g. 1,200×1,000×144 millimetres), although as would be recognized by the skilled person the disclosure extends to module stacks with any other suitable footprint size.

Figure 2:
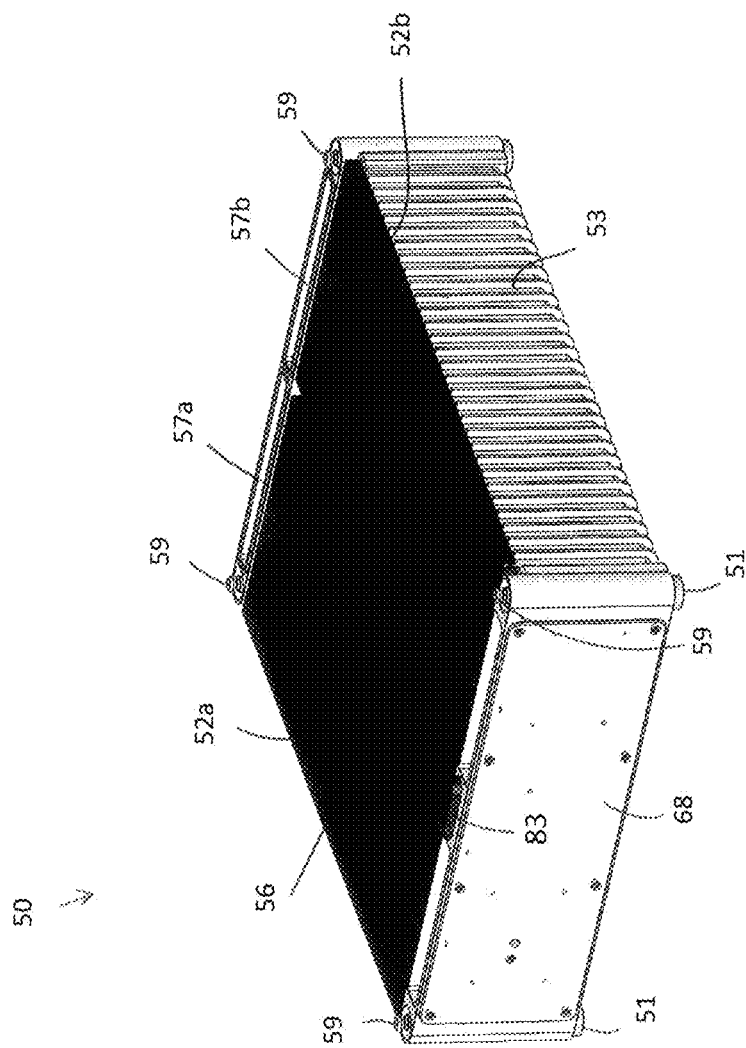
FIG. 2 shows a top of a battery module according to embodiments of the disclosure.
Figure 3:
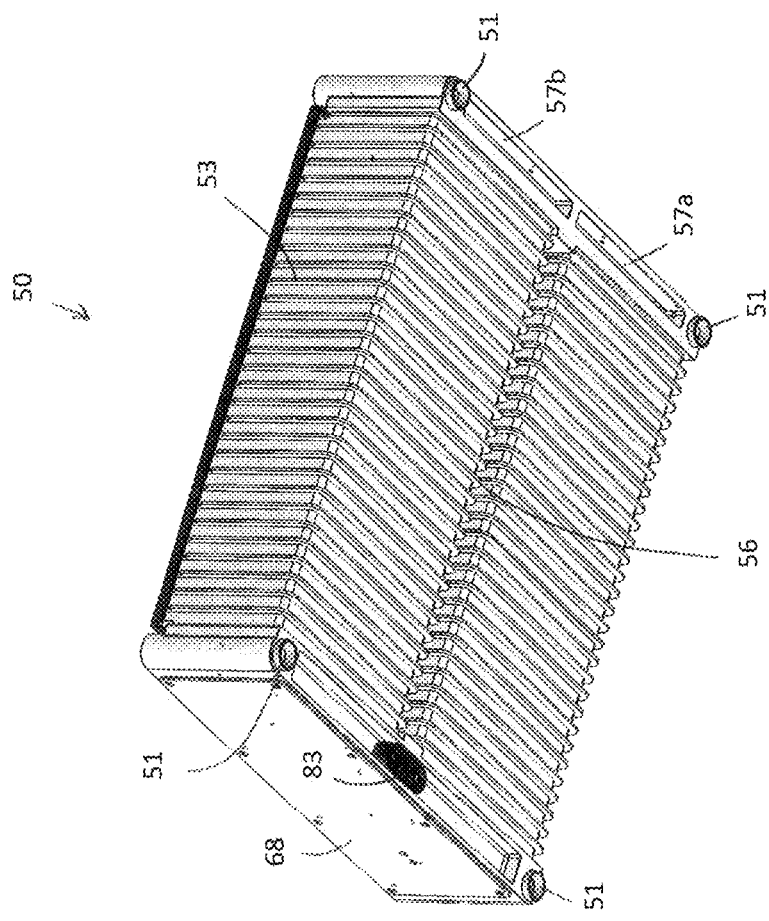
FIG. 3 shows a bottom of the battery module of FIG. 2.

Turning to FIGS. 2 and 3, there are shown top and bottom views of a battery module 50. Battery module 50 comprises a pair of cell enclosures 52a, 52b each housing a battery cell stack 72a, 72b (not shown in FIGS. 2 and 3). The left, right, and lower sides of cell enclosures 52a, 52b facing away from battery module 50 are provided with cooling fins 53 for facilitating heat transfer from the interior of cell enclosures 52a, 52b to the exterior of battery module 50.

At a rear of battery module 50 is provided an exhaust assembly comprising a pair of exhaust channels 57a, 57b. Exhaust channels 57a, 57b extend from exhaust apertures formed within the underside and the upper side of battery module 50. Therefore, exhaust channels 57a, 57b extend from the underside of battery module 50 to the upper side of battery module 50. Exhaust channels 57a, 57b are used to convey exhaust gases that may have formed within cell enclosures 52a, 52b (for example, in response to one or more of battery cell stacks 72a, 72b undergoing thermal runaway) away from battery module 50. In particular, each exhaust channel 57a, 57b is fluidly coupled to an interior of one of cell enclosures 52a, 52b such that exhaust gases emanating from one of battery cell stacks 72a, 72b within the cell enclosure may be directed away from battery module 50.

Extending between cells enclosures 52a, 52b is a cooling assembly comprising a cooling channel 56. Cooling channel 56 extends from a cooling aperture formed within each of the underside and the upper side of battery module 50. Therefore, cooling channel 56 extends from the underside of battery module 50 to the upper side of battery module 50. Cooling channel 56 is used to convey a cooling fluid between cell enclosures 52a, 52b. Cooling channel 56 extends substantially along the entire length of cell enclosures 52a, 52b and is separated from exhaust channels 57a, 57b by a physical interface such that a cooling fluid flowing through cooling channel 56 does not mix with exhaust gases flowing through exhaust channels 57a, 57b. The cooling fluid may include, for example, a liquid coolant, forced airflow (e.g. chilled air forced upwardly or downwardly through battery module 50, via cooling channel 56), or passive airflow (e.g. air flowing through battery module 50, via cooling channel 56, by free convection).

When two or more such battery modules 50 are stacked with one another, cooling channel 56 of one battery module 50 is aligned with cooling channel 56 of adjacent battery modules 50. In addition, exhaust channels 57a, 57b of one battery module 50 are aligned with exhaust channels 57a, 57b of adjacent battery modules 50.

In some embodiments, exhaust channels 57a, 57b and cooling channel 56 may be located elsewhere on battery module 50. For example, a cooling channel may be provided along each side of battery module 50 that faces away from battery module 50. As another example, battery module 50 may include a single exhaust channel servicing both cell enclosures 52a and 52b. The skilled person will recognize that any number of cooling channels and exhaust channels may be included in battery module 50, and that their number may be varied according to the desires of the skilled person, provided that the cooling channel(s) and exhaust channel(s) extend through battery module 50, from one side of battery module 50 to another side of battery module 50.

At each corner of battery module 50 is provided a male self-locking member 59. Male self-locking members 59 project upwardly from battery module 50 and are configured to engage or mate with corresponding female self-locking members 51 provided in the underside of another battery module 50. Each female self-locking member 51 comprises a tapered portion to facilitate engagement with a male self-locking member 59 of an adjacently disposed battery module 50. The tapered portions allow a certain tolerance of misalignment between the battery modules 50, such that the battery modules 50 may more easily "self-align" when being engaged with one another.

Power connectors 83 are provided at a front of battery module 50, one each of an upper side and an under side thereof. Power connectors 83 comprise a pair of conductive pins and a ground connection. The conductive pins may be retractable, as described in connection with power pins 67 of FIGS. 24A and 24B. Each power connector 83 comprises a tapered portion to facilitate engagement with a power connector 83 of an adjacently disposed battery module 50. Thus, the male power connector 83 on the top of battery module 50 comprises a tapered portion for facilitating engagement with a tapered female power connector 83 on an underside of an upper, adjacently disposed battery module 50. The tapered portions allow a certain tolerance of misalignment between the battery modules 50, such that the battery modules 50 may more easily "self-align" when being engaged with one another.

In conjunction with the tapered portions on one or both of male and female power connectors 83, power connectors 83 may be allowed to "float" with respect to cell enclosures 52a and 52b, to provide additional tolerance when power connectors 83 of battery module 50 are mated with power connectors 83 of adjacent battery modules.

FIG. 4 shows a rear of battery module 50 with a rear cover removed to show burst discs 64. Burst discs 64 are configured to open in response to sufficient pressure being applied to burst discs 64, as would take place in the event of thermal runaway occurring within cell enclosures 52a, 52b. When burst discs 64 are opened, exhaust gases may flow from the interior of cell enclosures 52a, 52b and away from battery module 50 via exhaust channels 57a, 57b.

FIG. 5 shows a battery cell stack 72 that is housed within one of cell enclosures 52a, 52b. Each battery cell stack 72 comprises multiple battery cells, groups of which are interconnected by bus bars 73.

Figure 6:
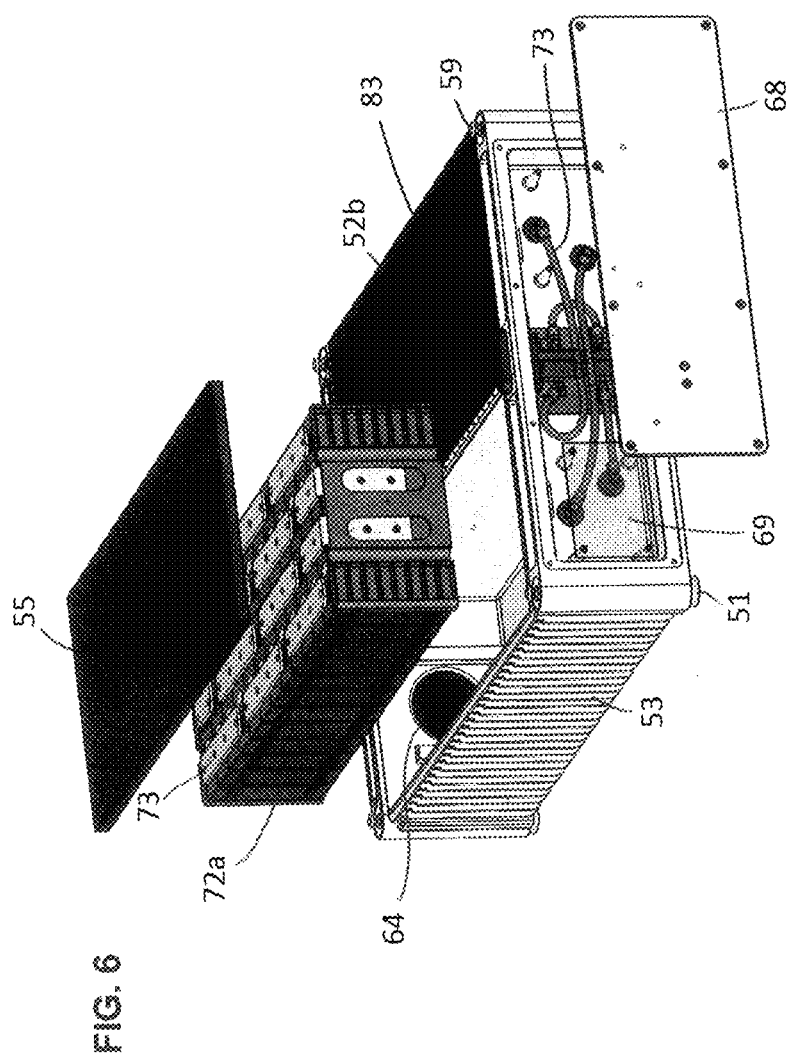
FIG. 6 is an exploded view of the battery module of FIG. 2.

Turning to FIG. 6, at a front end of battery module 50 is provided a module control board service panel 68. Service panel 68 may be removed to reveal a module control board 69. Module control board 69 comprises the control, communication, and power transmission hardware for battery module 50, and is responsible for monitoring battery module 50 and ensuring that the battery cells of battery cells stacks 72a, 72b remain balanced. Connectors 73 (which in some embodiments may be bus bars) interconnect power connectors 83 to battery cell stacks 72a, 72b housed within cell enclosure 52a, 52b. A cover 55 of cell enclosure 52a has been removed, showing battery cell stack 72a housed therein. Connectors 73 are configured to connect battery cell stacks 72a, 72b in series or in parallel, in order to configure the voltage and current rating of battery module 50.

Module control board 69 further includes a wireless communication module to enable battery module 50 to communicate with one or more other battery modules, and/or a pack controller. In some embodiments, other forms of wireless or wired communication may be enabled, such as optical communication achieved using optical ports provided on the upper and lower sides of battery module 50.

FIGS. 7 and 8 show multiple, stacked battery modules 50a, 50b, and 50c. Battery module 50c is stacked on top of battery module 50b which is stacked on top of battery module 50a. In FIG. 8, male self-locking members 59a and 59b of battery modules 50a and 50b are seen housed within receptive outer sleeves 61a and 61b, and received within corresponding female self-locking members 51b and 51c of battery modules 50b and 50c. The weight of an upper battery module 50 pressing down on a lower battery module 50 disposed immediately below upper battery module 50 causes outer sleeve 61 of lower battery module 50 to translate downwardly and actuate a gripper 62 located within female self-locking member 51. When actuated, gripper 62 engages male self-locking member 59 of the next lowest battery module 50. Thus, in the example embodiment of FIG. 8, outer sleeve 61b of battery module 50b is caused by the weight of battery module 50c to translate downwardly into engagement with gripper 62b of battery module 50b. Gripper 62b therefore engages with male self-locking member 59a of battery module 50a, thereby locking battery module 50b to battery module 50a. Until a weight is applied to battery module 50c (such as another battery module 50 or module stack cover 80), battery module 50c remains unlocked relative to battery module 50b, since gripper 62c is not yet actuated by outer sleeve 61c.

FIGS. 9 and 10 show, respectively, upper and lower views of module stack base 10 engaged with interface base 95. Module stack base 10 comprises a cooling channel 156 formed therein and positioned so as to be aligned with cooling channels 56 of battery modules 50 stacked on top of module stack base 10. In addition, module stack base 10 includes exhaust channels 157 at a rear end thereof, positioned so as to be aligned with exhaust channels 57a, 57b of battery modules 50 stacked on top of module stack base 10. Module stack base 10 further includes apertures 111 used to interface with a fork-lift truck or similar lifting apparatus, for transportation of battery module stack 100 as a whole. Module stack base 10 further comprises male self-locking members 159 so that a stack of battery modules 50 may be locked to module stack base 10, as described above. In some embodiments, module stack base 10 includes one or more fans for forcing air through battery module stack 100. In some embodiments, air may be delivered to battery module stack 100 through a duct system running beneath battery module stack 100, as described in further detail below. Further still, in some embodiments air may flow through battery module stack 100 by means of free convection, if the thermal duty cycle is sufficiently low.

Interface base 95, which may form part of the vessel on which module stack 100 is installed, includes an exhaust port 150 at an underside thereof, for the flow of exhaust gases away from module stack 100. As shown in FIG. 11, interface base 95 further includes power connectors 173 for electrically coupling module stack 100 to a pack controller (not shown).

Figure 12:
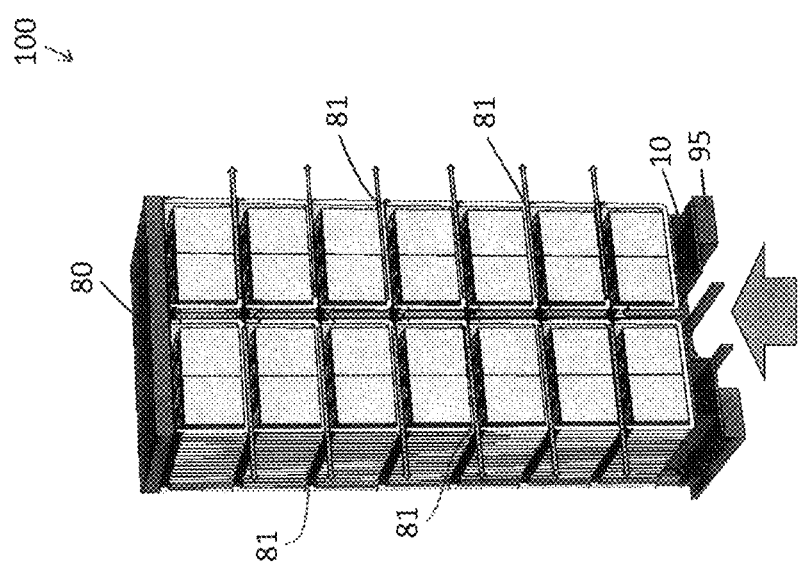
FIG. 12 shows air being pushed through the module stack of FIG. 1.

FIG. 12 shows forced air being delivered upwardly through the centre of module stack 100. In particular, the forced air is directed through interface base 95, through cooling channel 156 of module stack base 10, and through each cooling channel 56 of battery modules 50. Stack cover 80 at the top of module stack 100 enables the uppermost battery module to be locked to the next lowest battery module. In addition, stack cover 80 seals exhaust channels 57a,b and cooling channel 56 of the uppermost battery module. Therefore, by capping the top of module stack 100, the air pushed into module stack 100 is directed out of the sides of module stack 100, via gaps 81 provided between adjacently stacked battery modules 50. In some embodiments, instead of stack cover 80, the uppermost battery module may comprise a cooling channel 56 and exhaust channels 57a,b that are sealed integrally with the battery module. In still other embodiments, the air flowing through module stack 100 may exit at one or more other locations provided within module stack 100.

In some embodiments (not shown), battery modules 50 may be cooled using a liquid coolant as opposed to, or in addition to, airflow. In such embodiments, each battery module 50 may comprise one or more cooling plates positioned underneath cell enclosures 52a,b. Coolant entering a cooling plate may be distributed throughout the cooling plate (thereby absorbing heat from cell stacks 72a,b) and may then be directed upwardly out of the cooling plate, via piping or similar conduits positioned within cooling channel 56. After flowing through cooling channel 56, the coolant may be directed to a cooling plate in the next battery module 50 in the sequence of battery modules 50. In some embodiments, the liquid coolant may flow directly through cooling channel 56, without the need for piping. In some embodiments, instead or in addition to the cooling plate being located on an underside of battery module 50, battery module 50 may have one or more cooling plates provided on one or more other sides of battery module 50.

Figure 13:
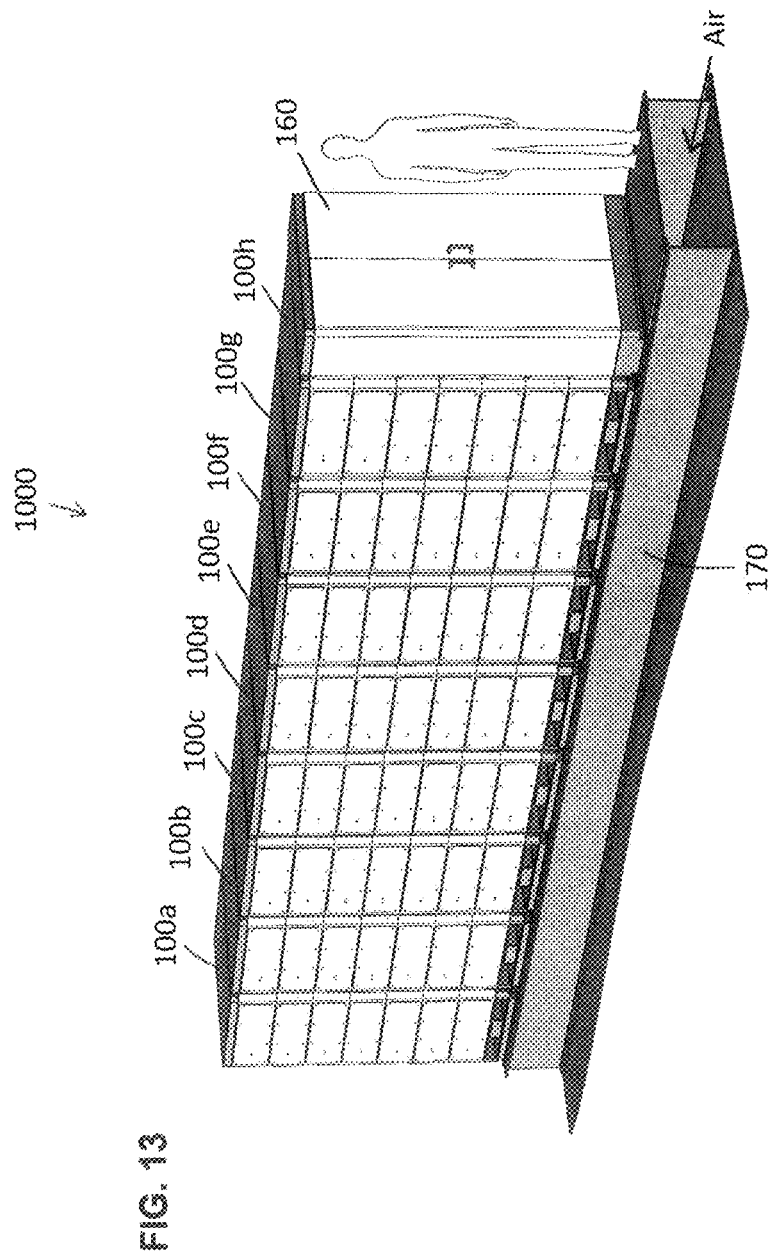
FIG. 13 shows multiple module stacks and a pack controller according to embodiments of the disclosure.

FIG. 13 shows an example of a multi-stack battery pack 1000 comprising multiple module stacks 100a-h. Each module stack 100a-h is positioned adjacent one or more other module stacks 100a-h. A pack controller 160 is located at an end of the multiple module stacks 100a-h. In some embodiments, pack controller 160 may be located elsewhere relative to the multiple module stacks 100a-h. In addition, while only a single row of module stacks is shown, the skilled person will recognize that the disclosure extends to multi-stack battery packs with any suitable number of rows of battery stacks.

Each module stack 100a-h is communicatively and operatively coupled to pack controller 160. Thus, a single pack controller is used to interface with all module stacks, thereby reducing the number of pack controllers that are required to control module stacks 100a-h. Chilled air may be delivered to each module stack 100a-h via a plenum 170 extending beneath each interface base 95 engaged with a module stack 100a-h. Air may flow along plenum 170 and may be directed upwardly through the central cooling channel of each module stack 100a-h, the central cooling channel being formed by the cooling channel 156 of the stack base 10, and the adjacently disposed cooling channels 56 of the battery modules 50 forming the module stack.

Figure 14:
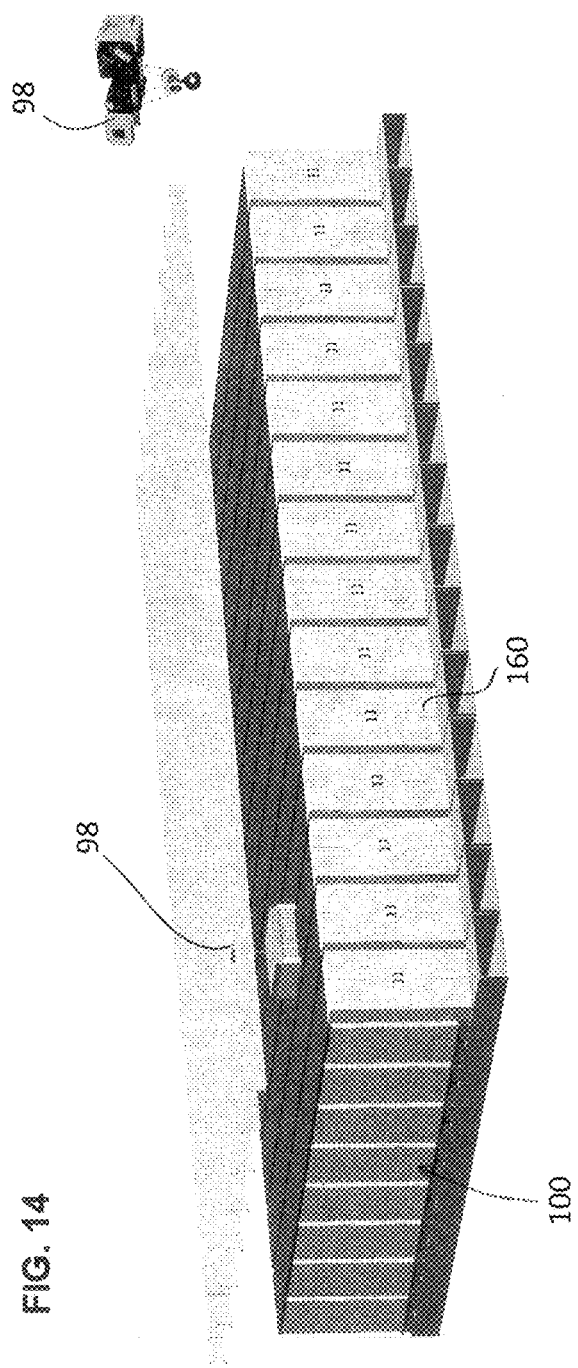
FIG. 14 shows multiple rows of module stacks and pack controllers, according to embodiments of the disclosure.

FIG. 14 shows an example embodiment of high-density battery storage with multiple rows of battery module stacks 100 arranged side-by-side. Each row of module stacks 100 terminates with a pack controller 160 configured to control the modules stacks 100 in the associated column of module stacks 100. Module stacks 100 may be oriented such that the module service panels 68 face service aisles interposed between every second pair of adjacent rows of module stacks 100. In some embodiments, in order to reduce the footprint of the multiple battery stacks 100, the rows of module stacks 100 may be positioned directly adjacent one another, without any service aisles. In order to service a module stack 100, a lifting mechanism may be used to extract individual modules 50 from the module stack 100. Another lifting mechanism 98, such as an I-beam hoist, is used to position stacks 100 into engagement with an interface base 95.

Figure 15:
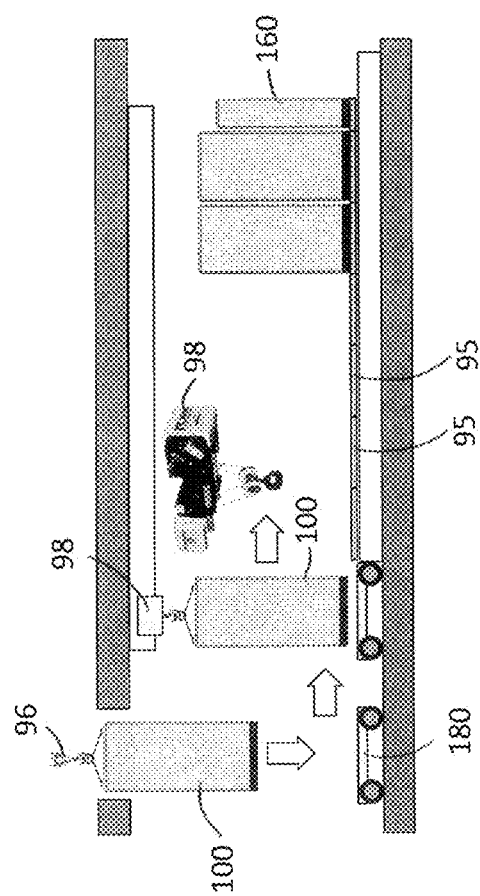
FIG. 15 shows a method of assembling a row of module stacks, according to embodiments of the disclosure.

FIG. 15 shows an example method of assembling a battery pack. Using a lifting mechanism 96 such as an overhead crane, a stack 100 of battery modules is positioned onto a movable pallet 180. For example, module stack 100 may be suspended from lifting mechanism 96 through the use of lifting straps wrapped around module stack 100. Another lifting mechanism 98, such as an I-beam hoist, is then used to position stack 100 into engagement with an interface base 95. Interface base 95 provides the power, communication, and cooling connections for each module stack 100. Once properly located, module stack 100 may be mechanically restrained relative to interface base 95, prior to use.

Below, there are now described alternative embodiments of a module stack, battery pack, and battery module.

Figure 16:
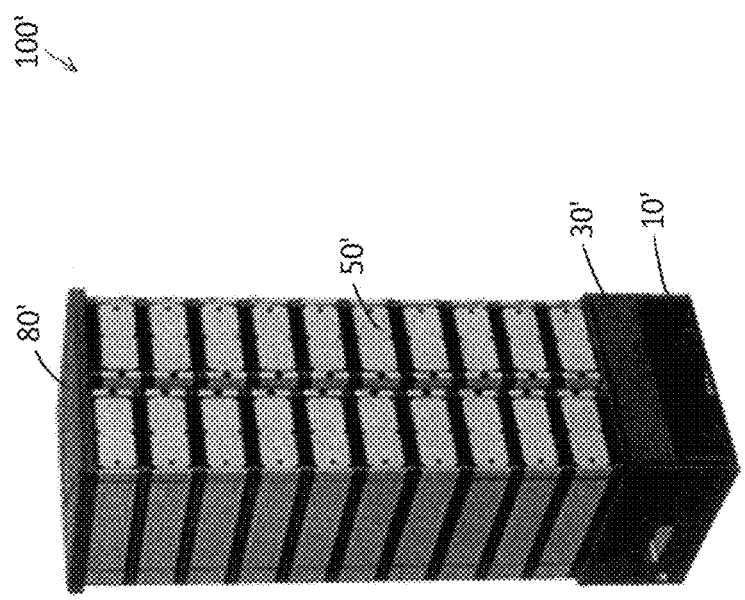
FIG. 16 shows a battery pack according to embodiments of the disclosure.

Turning to FIG. 16, there is shown a battery pack 100' according to an embodiment of the disclosure. Battery pack 100' is formed of a stacked arrangement of different components. In particular, battery pack 100' comprises an interface base 10' at a bottom thereof, a pack control module 30' stacked on top of interface base 10', and two adjacent columns of interconnected battery modules 50' stacked on top of pack control module 30'. A battery pack cover 80' is positioned at the top of battery pack 100', directly adjacent the two uppermost battery modules 50'. Each column is formed of an equal number of stacked battery modules 50', with the battery modules 50' of one column having an orientation that is flipped relative to the battery modules 50' of the other column. Thus, the battery modules 50' in the left-hand column (when facing the front of battery pack 100') are oriented right-side up, that is with their cooling plates (described in further detail below) facing towards interface base 10', whereas the battery modules 50' of the right-hand column are oriented upside down, such that their cooling plates face battery pack cover 80'. This particular stacking of battery modules 50' is only one possible way of arranging battery modules 50' within battery pack 100', and further examples are described in more detail below. It will furthermore be understood by the skilled person that the disclosure extends to battery packs with any number of stacked battery modules and any number of columns of stacked battery modules. In addition, in some embodiments the columns of battery modules may have different numbers of battery modules, in which case the battery pack cover may be split and a jumper cable or bus bar may be used to return the power path.

Figure 17:
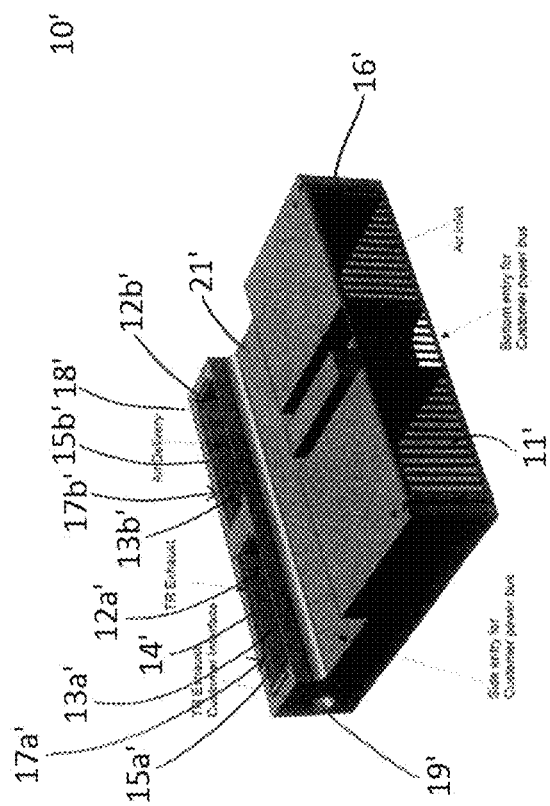
FIG. 17 shows an interface base according to embodiments of the disclosure.

Turning to FIG. 17, there is shown interface base 10' in more detail. Interface base 10' comprises a pair of cooling channels 12a', 12b' extending from a front 16' of interface base 10' to an upper side at a rear end 18' of interface base 10'. Cooling air may be drawn through a vent 11' at front 16' of interface base 10' to rear end 18', whereupon the cooled air may be forced upward through cooling apertures 13a', 13b' (in some embodiments, air may be drawn into interface base 10' through one or more other locations). Adjacent cooling apertures 13a', 13b' are provided thermal runaway or exhaust apertures 15a', 15b'. Exhaust apertures 15a', 15b' from part of exhaust channels 17a', 17b' that are in communication with respective thermal runaway exhaust ports 19' on either side of interface base 10' (in some embodiments, exhaust channels 17a', 17b' can communicate with a duct system on the bottom of interface base 10'). Exhaust channels 17a', 17b' and cooling channels 12a', 12b' are separated by a physical interface 14' such that a cooling fluid flowing through cooling channels 12a', 12b' does not mix with exhaust gases flowing through exhaust channels 17a', 17b'. Interface base 10' further comprises a recessed portion 21 providing space for a power bus.

Figure 18:
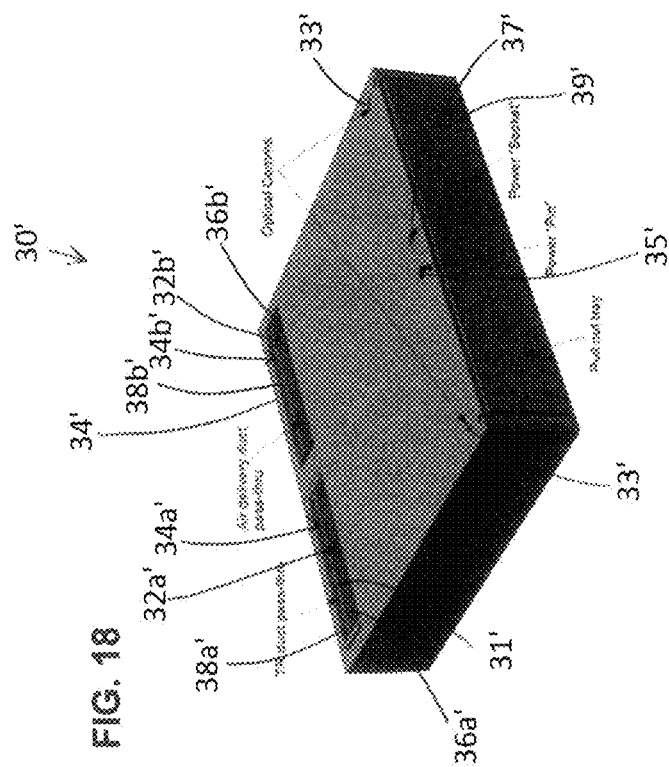
FIG. 18 shows a pack controller module according to embodiments of the disclosure.
Figure 19:
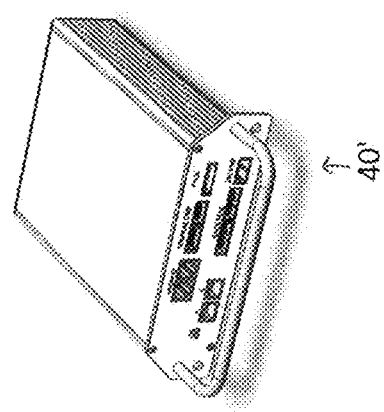
FIG. 19 shows a pack controller.

Turning to FIG. 18, there is shown pack control module (PCM) 30' in more detail. PCM 30' comprises exhaust channels 34a', 34b' extending from apertures in an underside of PCM 30' to exhaust apertures 38a', 38b' formed in the upper side of a rear end 34' of PCM 30'. Adjacent exhaust apertures 38a', 38b' are cooling apertures 36a', 36b' forming part of cooling channels 32a', 32b' extending from the upper side of PCM 30' to apertures in the underside of PCM 30'. Exhaust channels 34a', 34b' and cooling channels 32a', 32b' are separated by a physical interface 31' such that a cooling fluid flowing through cooling channels 32a', 32b' does not mix with exhaust gases flowing through exhaust channels 34a', 34b'. At a front of PCM 30' are located optical communication ports 33', a power pin 35' and a power socket 37'. PCM 30' comprises a compartment accessible by removal of a pull-out tray 39'. Within PCM 30' is housed Master Control Module 40' (FIG. 19). Master Control Module 40' is operationally and communicatively coupled to optical communication ports 33', power pin 35' and power socket 37'. In some embodiments, instead of using optical communication ports, communication between battery modules 50' may take place using wireless communication modules, or wired connections.

Turning to FIGS. 20 and 21, there are shown views of a battery module 50' in more detail. Battery module 50' comprises a cell enclosure 52' housing multiple battery cells. Each battery cell is encased in a cell carrier, for example a cell carrier as described in PCT publication WO 2017/181284. Other cell structures that do not employ cell carriers may be used. Electrical energy from the battery cells may be delivered to battery terminal connection studs 71' (see below) via bus bars.

Battery module 50' further includes a cooling assembly 54' comprising a cooling and exhaust manifold 55' with a cooling channel 56' extending from a cooling aperture 51' in the underside of battery module 50' to a cooling aperture 53' in the top side of battery module 50'. In the present embodiment, cooling assembly 54' further includes a heat sink in the form of a cooling plate 58' provided on the underside of battery module 50'. Thus, cooling aperture 51' is formed directly within cooling plate 58' such that cooling channel 56' extends from the underside of cooling plate 58' to the top side of battery module 50'. In some embodiments, battery module 50' may be provided without a cooling plate 58', in which case cooling channel 56' extends from the underside of cooling and exhaust manifold 55' to the top side of cooling and exhaust manifold 55'. Cooling plate 58' comprises a heat sink (for example a finned arrangement of conductive elements) for assisting in the transfer of heat away from cell enclosure 52'. Cooling channel 56' is in fluid communication with cooling plate 58' such that chilled air may flow through cooling channel 56' and cooling plate 58'. The air may then exit battery module 50' at a front 61' of cooling plate 58'.

Adjacent cooling channel 56' is an exhaust channel 57' extending from an exhaust aperture 59' in the underside of battery module 50' to an aperture 60' in the top side of battery module 50'. In the present embodiment, as battery module 50' includes a cooling plate 58', exhaust aperture 59' is formed within cooling plate 58'. Cooling channel 56' and exhaust channel 57' are separated by a physical interface 62' such that a cooling fluid flowing through cooling channel 56' does not mix with exhaust gases flowing through exhaust channel 57'. When two or more such battery modules 50' are stacked with one another, the cooling channel 56' of one battery module 50' is aligned with the cooling channel 56' of adjacent battery modules. In addition, the exhaust channel 57' of one battery module 50' is aligned with the exhaust channel 57' of adjacent battery modules.

In an alternative embodiment (not shown), battery modules 50' may be cooled using a liquid coolant as opposed to, or in addition to, airflow. In such an embodiment, cooling channel 56' is in fluid communication with cooling plate 58'. However, cooling plate 58' comprises a fluid flow path which extends from a fluid inlet between cooling channel 56' and cooling plate 58', to a fluid outlet between cooling plate 58' and cooling channel 56'. Thus, the liquid coolant may flow into cooling channel 56' via cooling aperture 51', into cooling plate 58' via the liquid inlet, back out of cooling plate 58' via the liquid outlet, and then out of cooling channel 56' via cooling aperture 53'. The exhaust coolant is then returned to the base of the stack where it may be recycled to a coolant system, for example the coolant system of a vessel on which battery pack 100' is deployed.

Thus, cooling assembly 54' is located such that heat generated within cell enclosure 52' may be transferred to a cooling fluid (e.g. a liquid coolant or a gaseous coolant, such as chilled air) flowing, via cooling channel 56', from the underside of battery module 50' to the upper side of battery module 50.

FIGS. 22 and 23 show cooling and exhaust manifold 55' in more detail. In particular, cooling and exhaust manifold 55' includes a thermal runaway exhaust port 63' extending from within cell enclosure 52' to exhaust channel 57', via cooling channel 56'. A burst disc 64' is provided at the interface between exhaust port 63' and exhaust channel 57'. Burst disc 64' is configured to open in response to sufficient pressure being applied to burst disc 64', as would take place in the event of thermal runaway occurring within cell enclosure 52'.

Returning to FIGS. 20 and 21, at a front end of battery module 50', there is provided an optical communication port 65' on the top side of battery module 50'. In addition, a manual power switch 66' is provided on the front face of battery module 50' and is configured to control retraction and extension of a power pin 67', as described in further detail below. A master control board service panel 68' may be removed from the front face of battery module 50' to reveal a master control board 69', as can be seen in FIG. 26. Thus, servicing of battery module 50', for example, may be facilitated by providing master control board 69', including control, communication, and power transmission hardware, at the front end of battery module 50'.

As mentioned above, instead of using optical communication ports, communication between battery modules 50' may take place using wireless communication modules, or wired connections. In addition, in order to service master control board 69', it may be necessary to first retract power pin 67' by actuating manual power switch 66'.

FIGS. 24A and 24B show, respectively, power pin 67' in a retracted state and power pin 67' in an extended state. As can be seen in FIG. 24B, rotation of manual power switch 66' causes corresponding linear movement of power pin 67', through the use of for example a suitable linear rotary converter. As shown in FIG. 25, a power socket 70' is provided directly opposite power pin 67'. Battery terminal connection studs 71' connect power pin 67' and power socket 70' to terminals of battery cells 72' housed within cell enclosure 52'.

Figure 28:
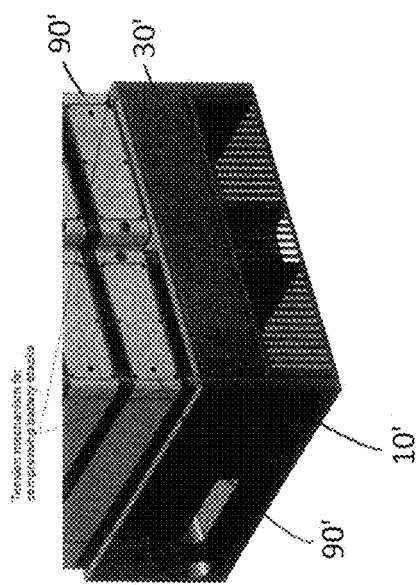
FIG. 28 shows a bottom of the battery pack of FIG. 16.
Figure 29:
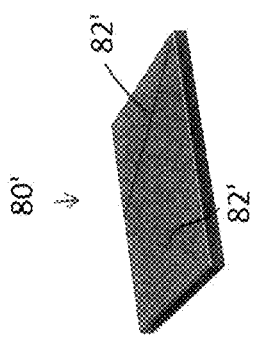
FIG. 29 shows a lid of the battery pack of FIG. 16.
Figure 27:
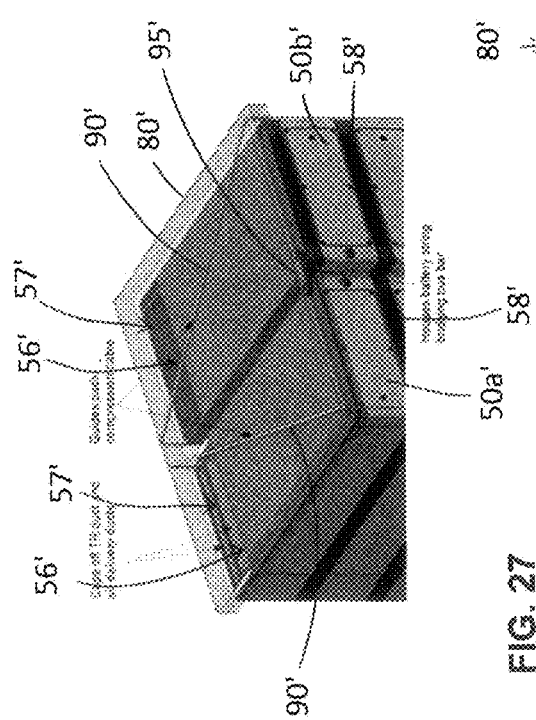
FIG. 27 shows a top of the battery pack of FIG. 16.

Turning to FIGS. 27 and 28, there is shown the top of battery pack 100' in more detail. Cover 80' seals exhaust channels 57' and cooling channels 56' of the topmost battery modules 50*a'*, 50*b'*. As such, air drawn into battery pack 100' is directed out the front of battery pack 100', via the front portions of cooling plates 58'. In alternative embodiments, instead of a cover, topmost battery modules 50*a'*, 50*b'* may comprise cooling channels 56' and exhaust channels 57' that are sealed integrally with the battery modules.

Battery pack 100' further includes a stabilizing mechanism designed, in the absence of a rack, to provide stability to pack 100', for example to prevent battery modules 50' from being accidentally dislodged from their stacked arrangement. In the present embodiment, the stabilizing mechanism comprises compression cables 90' that are attached to PCM 30' at a front of pack 100', extend over cover 80' in grooves 82' formed within cover 80', and are attached to PCM 30' on a rear side of pack 100' (not shown). A bridging bus bar 95' (which in some embodiments may be a cable) interconnects the power pin on the left-hand topmost battery module 50*a'* with the power socket on the right-hand topmost battery module 50*b'*. FIG. 28 shows compression cables 90' attached to PCM 30' at the front of pack 100'.

In order to remove a battery module 50' from battery pack 100', the power pin 67' of the battery module to be removed is retracted, and the stabilizing mechanism is disengaged by detaching compression cables 90'. A lifting mechanism is then used to remove the battery modules positioned directly above the battery module to be removed. The battery module to be removed may then be simply removed from the stack, for example for servicing. This same method may be used for disassembling the stack of battery modules.

Turning to FIGS. 30A-30D, there are shown various exemplary ways in which the battery modules (for example battery modules 50 or battery modules 50') of a battery module stack (for example battery module stack 100 or the module stack of pack 100') may be interconnected.

FIG. 30A depicts a battery pack 200 wherein a pack controller 202 is integrated with the module stack 204, similarly to the embodiment of FIG. 16. In particular, FIG. 30A shows a first, left-hand column 206 of battery modules positioned adjacent a right-hand column 208 of battery modules. The orientation of the battery modules in right-hand column 208 is flipped relative to that of the battery modules in left-hand column 206, such that power connections on one column are provided adjacent to power connections on the other column, thereby minimizing the electrical path length of the string of battery modules.

FIG. 30B depicts an alternative, exemplary setup with a single column of interconnected battery modules. A return conductive path 210 is provided from a cover 212 back to the pack controller 202. FIG. 30C shows another similar setup with a single column of interconnected battery modules. However, each battery module includes two adjacent stacks of battery cells (similarly to the embodiment of FIG. 2). FIG. 30D shows a setup that is identical to that of FIG. 30C except that, instead of optical communication ports, wireless communication transceivers or modules 214 are used to enable communication between battery modules. As mentioned above, a hardwired connection may instead be used for communication.

Figure 31:
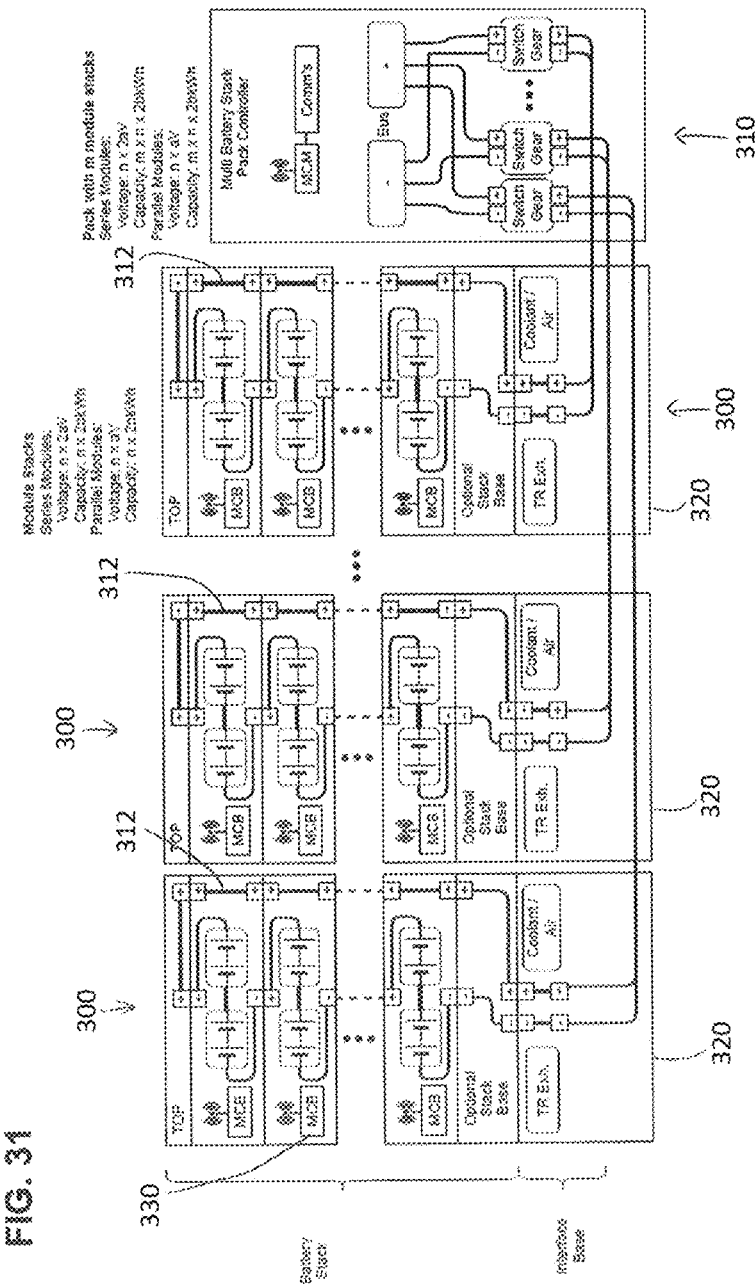

FIG. 31 shows an alternative configuration comprising multiple module stacks 300 and a single pack controller 310 configured to control module stacks 310 (similarly to the embodiment of FIG. 13). Each battery module comprises two battery cell stacks. A return conductive path 312 connects the top of each module stack 300 to an interface base 320, whereupon the electrical path is directed to pack controller 310. Wireless communication transceivers or modules 330 are used to provide communication between the battery modules. In some embodiments, two or more module stacks 300 can be connected in series before being connecting to pack controller 310, thereby providing improved configurability for the height and footprint of the battery pack.

In the above embodiments, the cooling fluid may also be used to heat the battery modules. An example case is when the battery modules have not been used and the surrounding environment is cold. "Cold" battery modules benefit from being warmed up to allow them to be used more efficiently. "Cold start" is an issue for most battery technologies.

Furthermore, in the above embodiments, the battery modules may comprise one or more self-aligning features for assisting alignment of multiple battery modules being engaged with one another. In particular, the self-aligning features allow battery modules to be lowered onto each other with a certain tolerance for misalignment. For example, the female self-locking members may comprise tapered portions, as described above.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A battery module stack comprising:
multiple battery modules, each battery module comprising:
at least one cell enclosure for housing a plurality of battery cells; and
a cooling assembly comprising a cooling channel:
extending from an aperture in a lower side of the battery module to an aperture in an upper side of the battery module; and
positioned such that heat generated within the cell enclosure may be transferred to a cooling fluid flowing, via the cooling channel, from the lower side of the battery module to the upper side of the battery module,
wherein the battery modules are arranged in a vertically stacked formation such that the cooling channel of at least one battery module is aligned with the cooling channel of at least one adjacent battery module.

2. The battery module stack of claim 1, further comprising:
a base at a bottom of the stacked formation; and
an air delivery device configured to cause air to flow through the base and through the cooling channels of the stacked battery modules, via a cooling channel formed within the base and in fluid communication with the cooling channels of the stacked battery modules.

3. The battery module stack of claim 1, wherein:
each battery module further comprises:
an exhaust assembly comprising an exhaust channel extending from an exhaust aperture in the lower side of the battery module to an exhaust aperture in the upper side of the battery module; and
an exhaust port extending from the cell enclosure to the exhaust channel; and
the exhaust channel of at least one battery module is aligned with the exhaust channel of at least one adjacent battery module.

4. The battery module stack of claim 3, wherein the base comprises an exhaust outlet in fluid communication with the exhaust channels of the stacked battery modules.

5. The battery module stack of claim 1, further comprising a pack controller communicatively coupled with the battery modules, and operable to control operation of the battery modules.

6. The battery module stack of claim 5, wherein the pack controller is stacked with the battery modules.

7. The battery module stack of claim 1, further comprising a cover positioned on top of the stacked formation to seal the cooling channel of the uppermost battery module of the stack.

8. The battery module stack of claim 1, further comprising a stabilizing mechanism configured to apply compression to the stacked formation for stabilizing the stacked formation.

9. The battery module stack of claim 8, wherein the stabilizing mechanism comprises one or more cables or bars attached to the cover and to one or more points at least as low as a lowermost battery module of the stacked formation.

10. The battery module stack of claim 1, wherein each battery module further comprises one or more locking members engaging with corresponding locking members of one or more of an immediately adjacent upper battery module and an immediately adjacent lower battery module.

11. The battery module stack of claim 10, wherein the one or more locking members of a battery module are configured to engage with the corresponding locking members of an immediately adjacent upper battery module in response to a further battery module being stacked on top of the immediately adjacent upper battery module.

12. The battery module stack of claim 1, wherein the cooling channel of an uppermost battery module of the stack is sealed.

* * * * *